United States Patent
Gelardi et al.

[11] Patent Number: 5,884,761
[45] Date of Patent: Mar. 23, 1999

[54] PLASTIC TRAY BOARD ATTACHMENT

[75] Inventors: John A. Gelardi; Anthony L. Gelardi, both of Cape Porpoise, Me.

[73] Assignee: Sagoma Plastics, Biddeford, Me.

[21] Appl. No.: 928,755

[22] Filed: Sep. 12, 1997

[51] Int. Cl.$^6$ .................................................. B65D 85/57
[52] U.S. Cl. ........................ 206/308.1; 206/310; 206/312
[58] Field of Search .............................. 206/308.1, 310, 206/311, 312, 313

[56] References Cited

U.S. PATENT DOCUMENTS

| | | |
|---|---|---|
| 4,709,812 | 12/1987 | Kosterka . |
| 4,771,890 | 9/1988 | Hofland et al. . |
| 5,236,081 | 8/1993 | Fitzsimmons et al. . |
| 5,366,074 | 11/1994 | O'Brien et al. . |

*Primary Examiner*—David T. Fidei
*Attorney, Agent, or Firm*—James Creighton Wray; Meera P. Narasimhan

[57] ABSTRACT

A CD package has a plastic tray with a central recess for receiving an holding a compact disc. Downward extensions on sides of the tray have inward projecting rails. A paper board has two panels and an intermediate spine separated by creases. One of the panel forms a base for permanent attachment to the tray. The base has side edges with recesses which cooperate with the downward extensions. Distance between opposite inner edges of the recesses is the same as distance between opposite inner surfaces of the downward extensions. The paper board and tray are permanently assembled by curving the paper board, bringing the paper board and tray into contact with the recesses in edges of the board aligned with the downward extensions of the side walls of the tray. Releasing the curvature of the board pops the board into place with the recesses engaging the downward extensions. Edges of the base lie along edges of the tray. The spine covers the back of the tray, and the second panel covers the tray. Multiple tray packages are created by enlarging and adding spines and panels and forming recesses in the side edges of each panel which will hold an identical tray.

19 Claims, 6 Drawing Sheets

PLASTIC TRAY BOARD ATTACHMENT

SUMMARY OF THE INVENTION

A new attachment of a paper board to a plastic tray allows the two components to be assembled with one another without the need of glue of other bonding means and without using complex machinery. Assembly takes place in one step. The tray is molded, and the board is die cut with the features and in the precise positions that are needed for assembly. There is no folding, snapping, pivoting, sliding, locking or other steps that employ physical alteration or permanent manipulation of the tray or the board for assembly. Using rails that are molded in position allows for simple assembly of the two components.

A central product holding tray is closed on its bottom, spine and top by a hinged cardboard printed on both sides. Two opposite sides of the tray have spaced downward extensions with inward-projecting rails. The board is supported by the rails. The base of the board which connects to the rails has recesses which are co-extensive in width and in thickness with the downward extensions. The recesses in the opposite sides of the board base fit tightly against the inner edges of the downward extensions on the side walls of the tray above the rails. The short edges of the recesses extend outward around the downward extensions of the tray to anchor the board base against sliding or twisting. The four reference edges of the board are the recessed edges which fit tightly with the four reference edges of the tray, which are the inner surfaces of the downward extensions above the rails. The side and front edges of the board base lie beneath the lower edges of the sides and front of the tray.

To assemble the board and tray, the board is cupped and juxtaposed with the tray bottom. Releasing the cupped board pops the base into the rails. The recessed edges of the board press against the inward surfaces of the downward extensions. Ends of the recesses engage ends of the downward extensions of the tray, preventing relative longitudinal movement. The remaining edge surfaces of the board base align with the lateral and front surfaces of the tray. The new assembly allows manufacturing with simplified equipment.

In a single tray embodiment, the board has two parallel creases to form hinges. The area between the hinges forms a spine which overlies the back of the tray. The remainder of the board forms the cover for overlying the product-holding recess of the tray. The edges of the top are aligned with lateral and front surfaces of the tray when the top is in the closed position.

In a multiple tray embodiment, at least one spine is enlarged to accommodate thickness of two or three trays and additional recesses are formed in the lateral edges of the board to hold identical trays.

These and further and other objects and features of the invention are apparent in the disclosure, which includes the above and ongoing written specification, with the claims and the drawings.

DETAILED DESCRIPTION OF THE PREFERRED EMBODIMENTS

Figure 1:
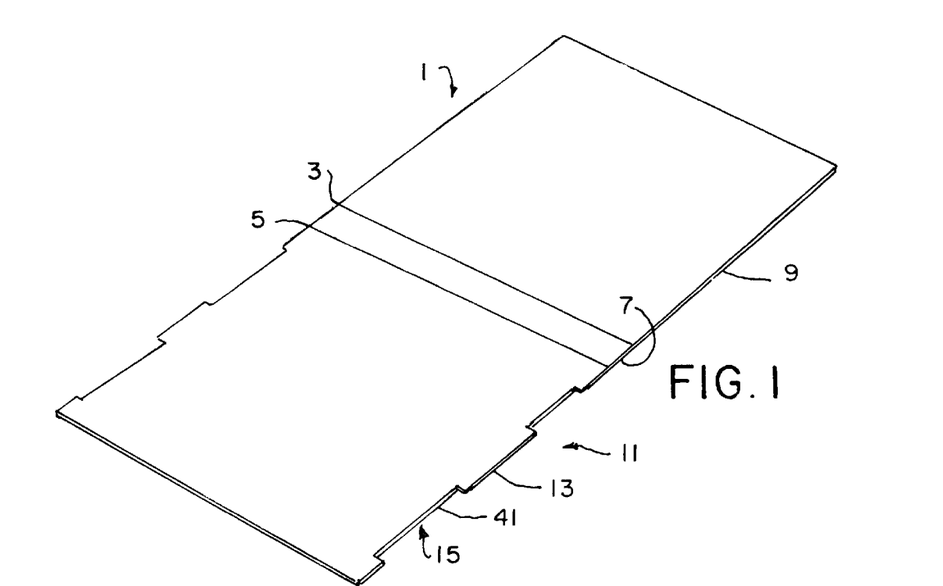
FIG. 1 shows a paper board framed with tray attaching recesses.
Figures 2, 3:
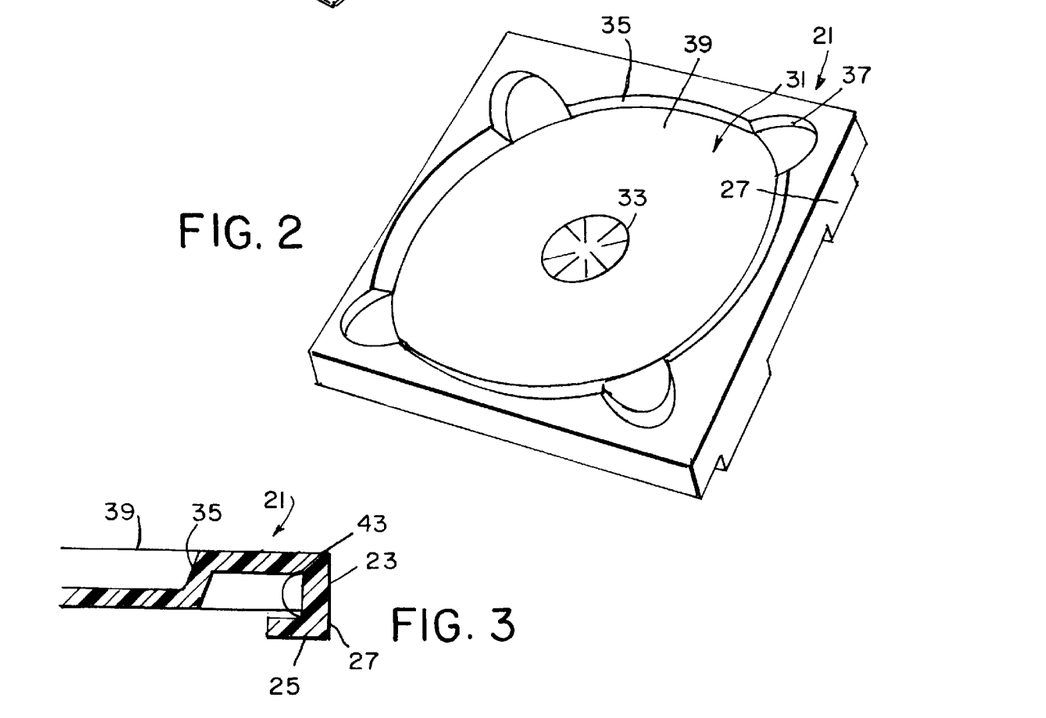
FIG. 2 shows a tray with sides having downward extensions and board attaching rails.
FIG. 3 is a cross-sectional detail of a tray, a downward extension and rail.

As shown in FIGS. 1–3, a paper board 1 is provided with creased hinges 3,5 to form a central spine 7 which joins a cover 9 and a base 11. Lateral edges 13 of base 11 have recesses 15 for attachment of the paper board to a plastic tray 21 as shown in FIG. 2. Opposite lateral sides 23 of the tray 21 have inward directed rails 25 at the bottoms of downward extensions 27. The downward extensions 27, rails 25 and the recesses 15 allow the two components to be assembled with one another without the need of glue or other bonding means and without using complex machinery. The tray 21 is molded and the board is die cut with the features and in the desired positions that are needed for assembly. There is no folding, snapping, pivoting, sliding, locking or other steps that employ physical alteration or permanent manipulation of tray or board for assembly. Using rails that are molded in position allows for simpler assembly of the two components.

For holding a compact disc, the tray 21 has a central depression 31, a rosette 33 and side walls 35 with finger openings 37. The bottom 39 is a flat surface of the tray. The bottom 39 may also be open.

The central product holding tray 21 is closed on its bottom, spine and top by a hinged cardboard 1 printed on one or both faces. Two opposite lateral sides 23 of the tray have downward extensions 27 with inward-projecting spaced rails 25. The base 11 of the board 1 which connects to the rails has recesses 15 which are co-extensive with the cross-sectional dimensions of the downward extensions 27. The edges 41 within the recesses 15 in the opposite side edges of the board base 11 fit tightly against the inner surfaces 43 of the downward extensions 27 on the side walls 23 of the tray above the rails 25, as shown in FIG. 3. The remaining lateral edges 13 of the board base extend outward between and at the ends of the downward extensions 27 of the tray sides to anchor the board base against sliding or twisting. The four reference edges of the board are the recessed edges 41 which fit tightly with the four reference edges of the tray, which are the inner surfaces 43 of the downward extensions above the rails.

Figure 4:
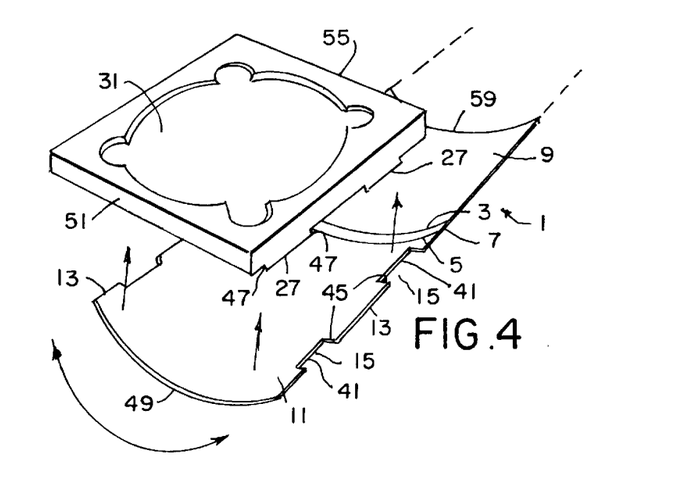
FIG. 4 shows cupping of the board in preparation for its attachment to tray.
Figure 5:
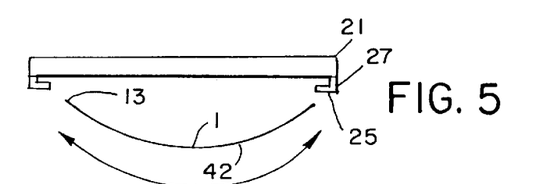
FIG. 5 is an end view of the tray and cupped board.
Figure 6:
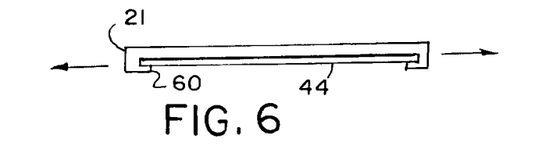
FIG. 6 an end view of the tray and attached board.

To assemble the board and tray, the board is cupped as shown in FIGS. 4 and 5, and the edges 13 are juxtaposed with the tray bottom. Releasing the cupped board 42 pops and flattens 44 the base 11 above the rails 25. The recessed edges 41 of the board fit against the inward surfaces 43 of the downward extensions 27. Ends 45 of the recesses 15 engage ends 47 of the downward extensions of the tray, preventing relative longitudinal movement. The rails 25 engage surfaces of the board inward of the recesses 15, preventing separation of the board and base The remaining edge surfaces 13, 49 of the board base align with the lateral surfaces 53 and front surface 51 of the tray. The new assembly allows manufacturing with simplified equipment.

In a single tray embodiment, the board has two parallel creases 3, 5 to form hinges. The area between the hinges forms a spine 7 which overlies the back 55 of the tray. The remainder of the board forms the cover 9 for overlying the product-holding recess 31 of the tray. The edges 57, 59 of the cover are aligned with lateral and front surfaces 53, 51 of the tray when the cover is in the closed position.

Features of FIGS. 1–6 have been enlarged for clarity.

Figure 7:
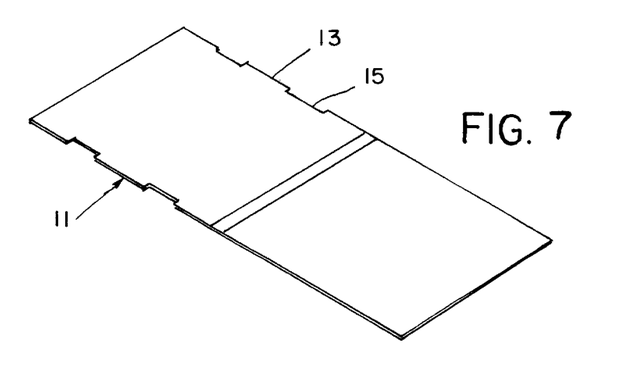
FIG. 7 is perspective view of a board.
Figure 8:
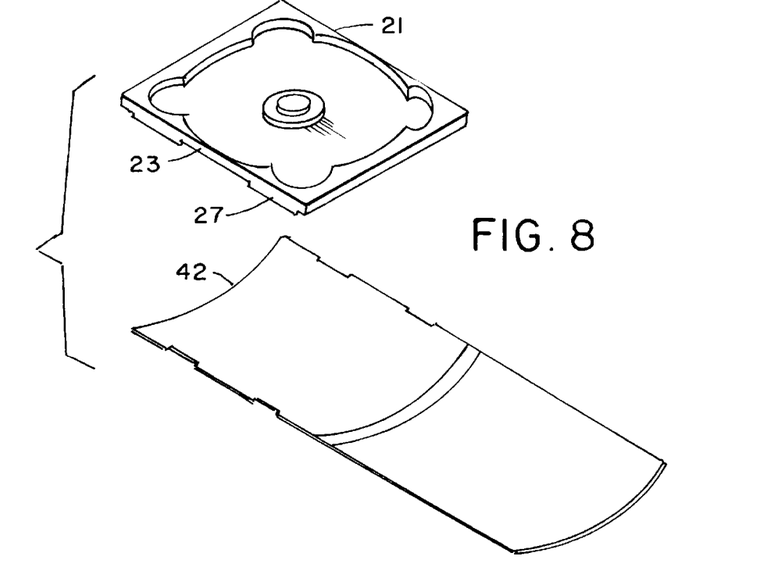
FIG. 8 is a perspective view of a cupped board and tray ready to be assembled, showing relative sizes of the board, recesses, tray and extensions.
Figure 9:
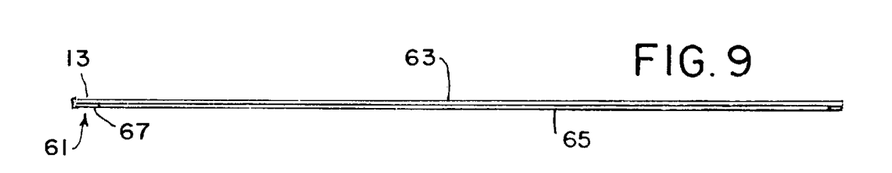
FIG. 9 is an end view of a two-layer board.
Figure 10:
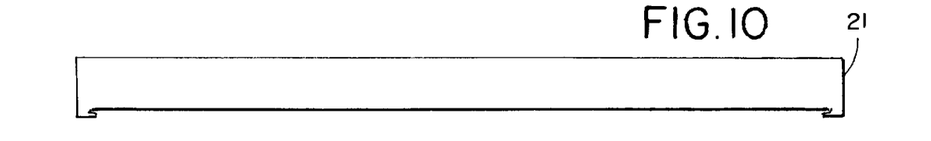
FIG. 10 is an end view of a tray.
Figure 11:
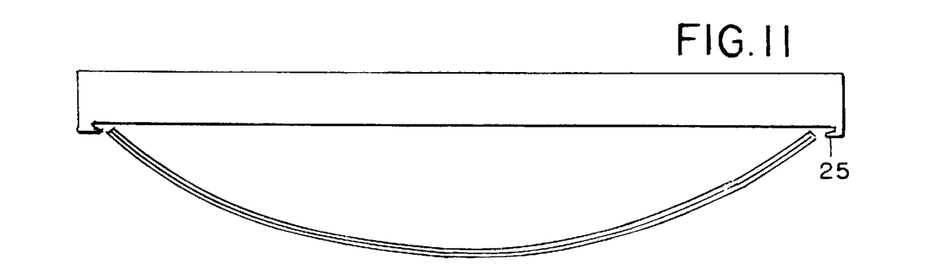
FIG. 11 is an end view of a tray and cupped two-layer board.
Figure 12:
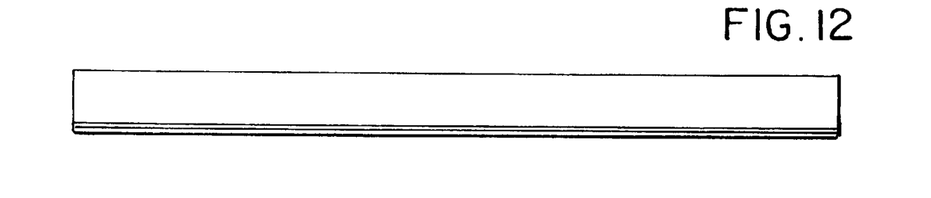
FIG. 12 is and end view of an assembled tray and board.

FIGS. 7 and 8 show an example of commercial embodiments. As shown in FIGS. 7 and 8, the recesses 15 in sides 13 of base 11 are shallow, sufficient only to accommodate the thickness of the downward extensions which is the same as the thickness of the molded tray 21. The downward extensions 27 on sides 23 of the tray are short. The extensions and are equal to the thickness of the rails 25 and the thickness of the base 11, which fits above the rails. The curvature 42 of board 11 is slight, sufficient only to reduce the horizontal distance between edges 41 of recesses to match the distance between inward edges 60 of opposing rails 25. The rails extend downward beyond the flat bottom surface of the base 11. The package rests on the four rectangular areas of the rails.

FIGS. 9–12 show mid-rail cross-sectional views a two-layer base 61 for insertion in the tray 21. The upper layer 63 is provided with lateral recesses similar to lateral recesses 13 of board 11. The lower layer 65 is provided with recesses 67 which are extensive with the lateral and longitudinal dimensions of the rails. The thickness of the lower layer 65 is equivalent to the thickness of the rail. The result is a package which has a flat bottom surface. The rails appear as four rectangular areas in the flat bottom surface.

Figure 13:
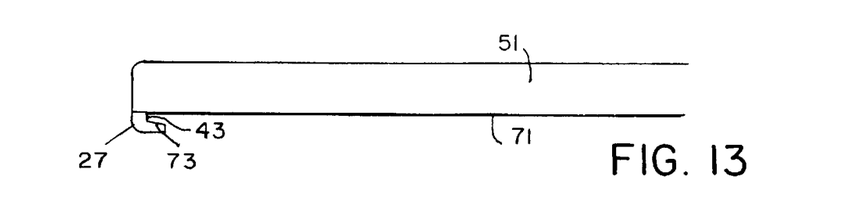
FIG. 13 is an end view detail of a tray.
Figure 14:
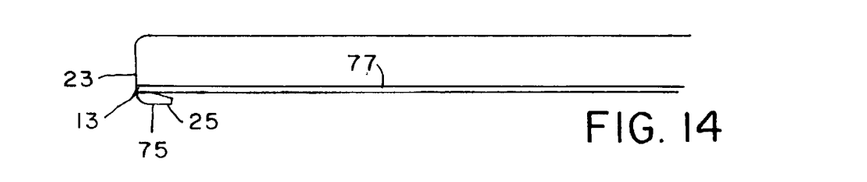
FIG. 14 is an end view detail of a tray and board.
Figure 15:
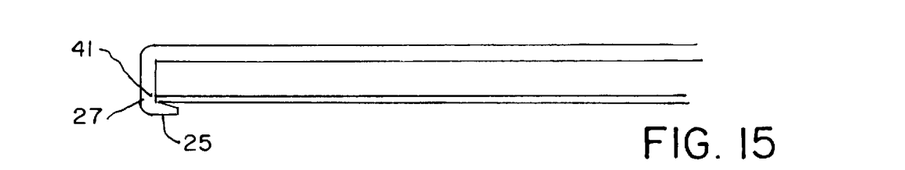
FIG. 15 is a cross-section detail of a tray and board taken at a rail.

FIGS. 13 and 14 are partial end view details of a tray and a board assembled on a tray. FIG. 15 is a partial cross-sectional detail of a board and a tray.

As shown in FIG. 13, the extension 27 extends downward below the lower edge 71 of front wall 51. The side and back walls have lower edges at the same level as edge 71. Inner surface 43 of the downward extension is generally perpendicular. Upper surfaces 73 of the rail 25 may be sloped to aid in assembly of the board 1. Once the board is assembled, its own rigidity maintains the assembly.

As shown in FIG. 14, the edge 13 of the board 1 aligns with the outer surface of the side wall 23 of the tray. The rail 25 extends below the board. Lower surfaces 75 of the rails form rectangular feet on which the package rests. The upper surface 77 along the edges of the board fits against lower edges of the front, sides and back of the tray.

FIG. 15 is a cross-sectional detail taken at a rail 25 showing the inner surface 41 of the recess fitting against the inner surface 43 of the downward extension 27.

Figure 16:
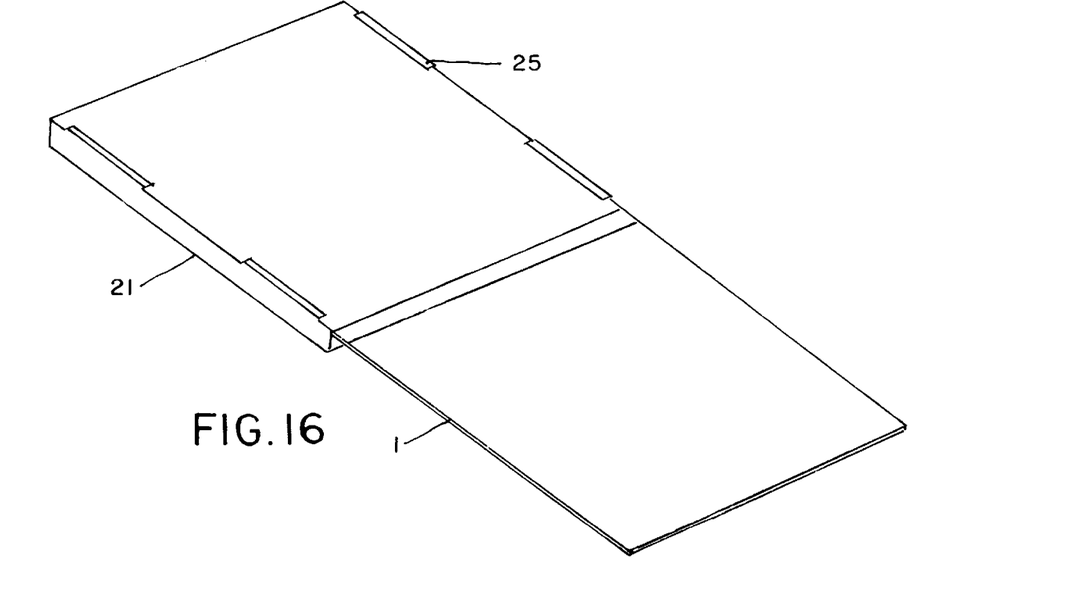
FIG. 16 is a bottom view of an assembled tray and board.

FIG. 16 is a bottom view of the package showing the board 1 connected to the tray 21, with the rail 25 projecting over edge surface areas of the board.

Figures 17, 18:
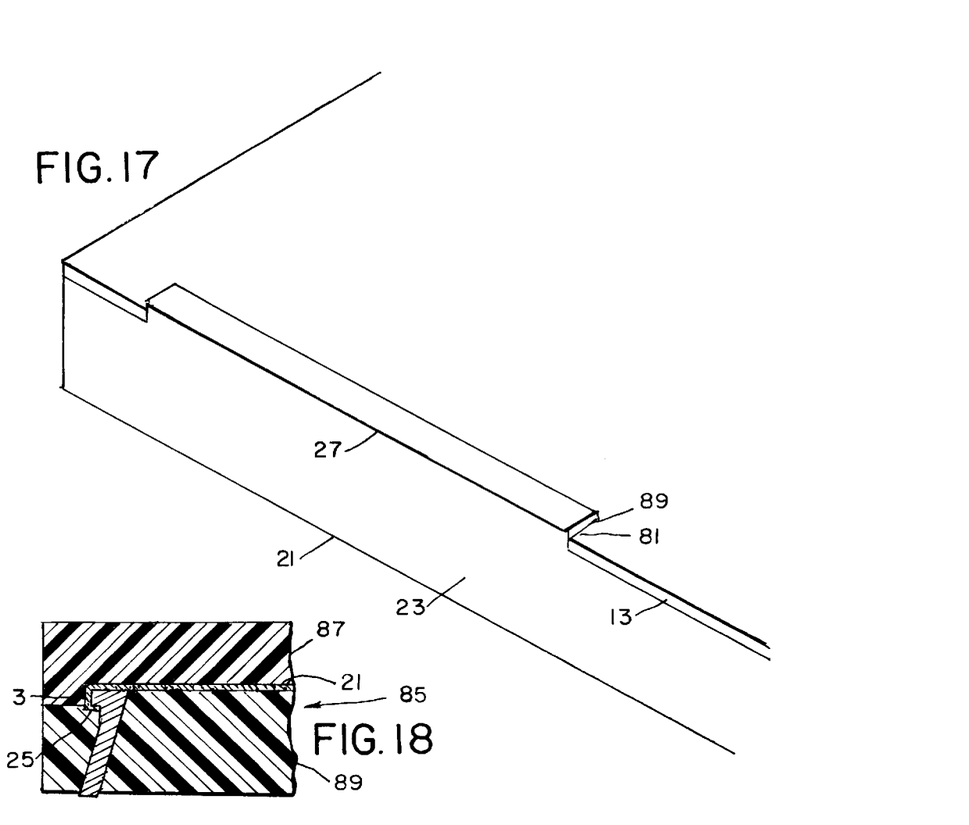
FIG. 17 is a partial bottom view detail of an assembled board and tray.
FIG. 18 is a partial detail of a mold for the tray and rail.

FIG. 17 is an edge view detail of a preferred connection between the board base 11 and the tray 23. FIG. 17 shows the preferred shape of the rail with the inner surface having a flat portion 81 and a sloped portion 73. The downward extension 27 is a smooth continuation of the side wall 23 of the tray 21. the edge 13 of the board is aligned with the side wall 23.

Figures 19, 20:
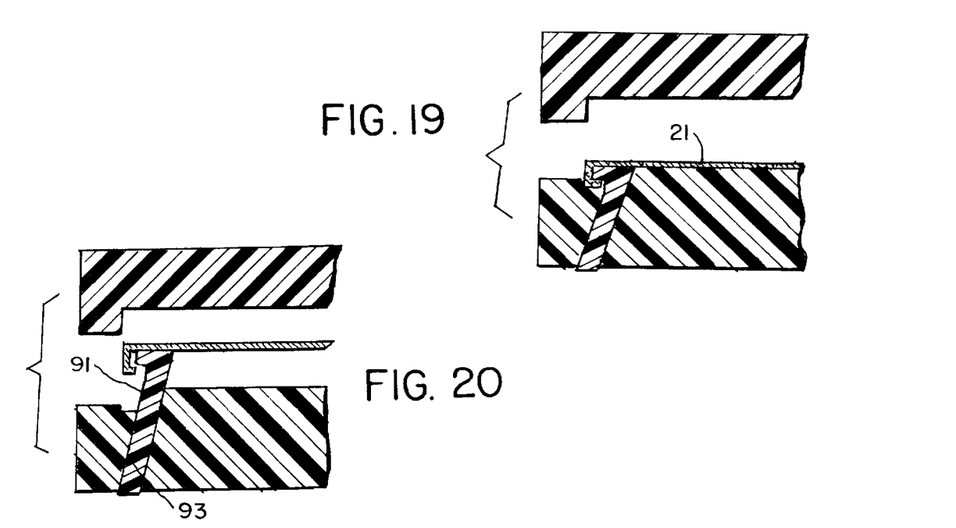
FIG. 19 is a detail of a mold of FIG. 18 showing the male and female parts separated.
FIG. 20 is a detail of a mold of FIGS. 18 and 19 showing the parts separated and a rail-forming shut-off diagonally extended to release a rail.

FIG. 18, 19 and 20 show a mold 85 for forming the tray 21.

As shown in FIG. 18, the mold 85 is closed, and the tray 21 has been injected and formed. The upper part 87 of the mold is closed on the lower part 89 of the mold, and the shut-off 91 forms the inner surface of the side wall 23 and the upper surface of the rail 25. The downward extension inner surface is a continuation of the side wall inner surface.

FIG. 19 shows the upper part 87 of the mold separated from the lower part 89. In FIG. 20 the shut-off 91 is slid upwardly along a diagonal groove 93 to withdraw the upper end of the shut-off 91 from the rail 25 so that the tray 25 may be removed from the mold and shut-off. Four similar shut-offs may be used.

Figure 21:
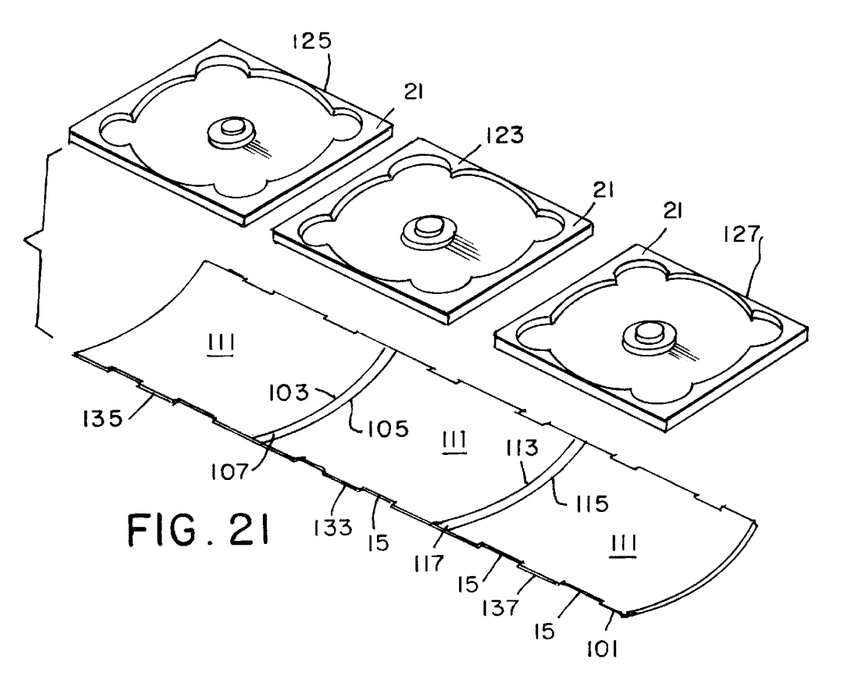
FIG. 21 is a schematic representation of joining three trays on one board.
Figure 22:
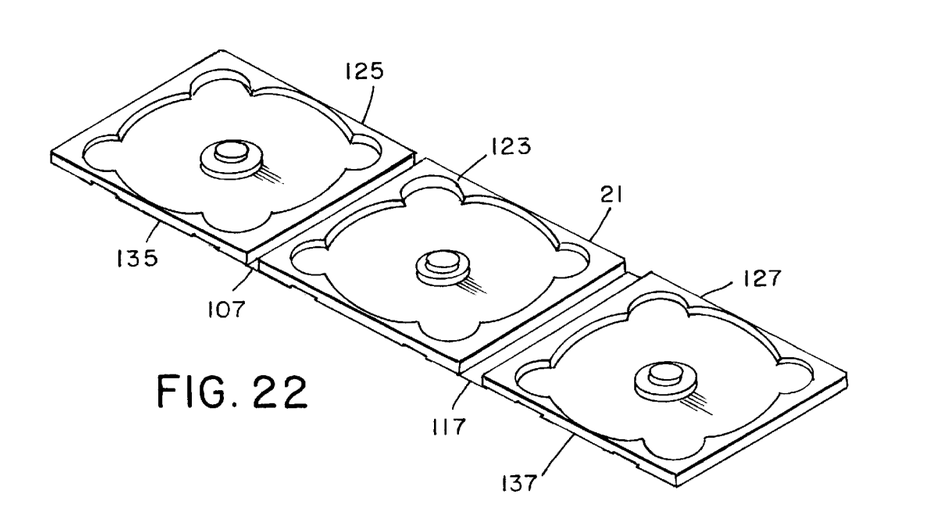
FIG. 22 is a schematic representation of three trays joined to a single board ready for folding.

As shown in FIGS. 21 and 22, a board 101 is joined to multiple trays 21. The board 101 has creases 103 and 105 which provide a spine 107 of double width, equivalent to the thicknesses of two trays 21. Instead of a cover, the board 101 has multiple base areas 111. Two additional creases 113 and 115 form an enlarged spine area 117 which accommodates the thicknesses of three trays plus the additional thickness of downward extensions on one of the trays.

As shown in FIG. 21, the base areas 111 each have recesses 15. As shown in the drawings, three trays 123, 125 and 127 are aligned with corresponding sections 133, 135 and 137 of the board 101. Board 101 is cupped and the three trays 21 are aligned with the respective sections. The board and the trays are brought together and joined, as shown in FIG. 22. Then tray 125 is folded on top of tray 123, with the double spine area 107 acting as a spine for both trays. Finally, tray 127 is folded on top of panel 135. Panel 137 forms the cover of the package.

When only two trays are used, tray 127, panel 137 and spine 117 are omitted. In that case, panel 135 and its attached tray 127 form the cover. Alternatively, spine 117 may be reduced to a double spine, and panel 137 may be formed without recesses 15 and may become the cover.

Four trays may be accommodated by making spine 117 long enough to accommodate four tray thicknesses plus the thicknesses of two downward extensions. An additional spine of two tray thickness similar to 107 may be added at the end of panel 137 and an additional panel section similar to 135 may be added to the end of the additional spine. The end tray may be folded upon the tray 127. The end tray 125 may be folded upon the tray 123 and the inward folded trays may be again folded on spine 117 to form a four tray package.

In the situations where the side walls 35 are configured to hold a CD, the rosette 33 may be omitted, and the face 39 may be omitted so that the base panel 11 forms the bottom of the tray as well as the bottom of the package. The tray preferably is molded of plastic.

The board may be made of any suitable material such as plastic or single or multiple layer cardboard.

The outer side of the base and cover and spine are printed with appropriate graphics. The inside of the cover and the inside of the spine may also be printed. When the tray is made of clear plastic, the upper side of the base may be printed.

While the invention has been described with reference to specific embodiments, modifications and variations of the invention may be constructed without departing from the scope of the invention, which is defined in the following claims.

We claim:

1. A compact disk package having a rectangular plastic tray with a central circular depression for receiving a compact disk, a central rosette within the depression for holding a compact disk and finger openings extending from the central depression toward corners of the rectangular tray and in communication with the central depression for inserting fingers when removing a compact disk from the tray, the tray having a front and back and opposite sides, downward extensions extending downward from the opposite sides the downward extensions having inner surfaces and outer surfaces and opposite edges extending between the inner and outer surfaces, rails extending inward from lower portions of the downward extensions, a board for mounting on the tray above the rails, the board having first and second panels and a spine interconnecting the panels, the spine being defined by first and second parallel creases at the ends of the first and second panels, the first panel comprising a base having the first crease as an inner end and having an outer edge remote from the inner end and having first and second opposite side edges extending between the outer edge and the inner end, recesses formed in the side edges, the recesses having dimensions commensurate with dimensions of the downward extensions, the recesses having inner edges for fitting against the inner surfaces of the downward extensions, the recesses having opposite edges lying along the opposite edges of the downward extensions, the opposite side edges of the base being aligned with sides of the tray, the front edge of the base being aligned with the front of the tray and the end of the base being aligned with the back of the tray.

2. The apparatus of claim 1, wherein the second panel is a cover which overlies the tray when the spine overlies the back of the tray.

3. The apparatus of claim 1, wherein the inner edges of the recesses and the inner surfaces of the downward extensions are reference surfaces which fit together, holding the first panel of the board in flat condition and preventing relative twisting of the board and tray.

4. The apparatus of claim 1, wherein the ends of the recesses engaging corresponding ends of the downward extensions prevent the board from sliding relative to the tray.

5. The apparatus of claim 1, wherein the rails further comprise upward facing surfaces and wherein the upward facing surfaces are downward and inward sloped for facilitating reception of the base.

6. The apparatus of claim 5, wherein inner portions of the upward facing surfaces are sloped downwardly and inwardly and wherein outward portions of the upper surfaces of the rails near the downward extensions are generally horizontal and perpendicular to the sides of the tray.

7. The apparatus of claim 1 wherein the board is assembled to the tray by cupping the board longitudinally and juxtaposing the side edges of the cupped board near a bottom of the tray inside the rails and releasing the cupping of the board and allowing the board to resume a flat condition for engaging the inner surfaces of the downward extensions with the inner edges of the recesses.

8. The apparatus of claim 1 wherein the second panel comprises a second base having side edges and recesses in the side edges for receiving a second tray and further comprising a second tray connected to the second base and wherein the spine between the first and second panels comprises a double width spine for accommodating thicknesses and lying against backs of the two trays.

9. The apparatus of claim 1 further comprising a second spine connected to a remote edge of the second panel and a third panel connected to the second spine, the second spine having a width corresponding to the thicknesses of three trays plus a downward extension, the third panel comprising a base and having side edges with recesses for receiving a third tray, wherein the first tray is folded upon the second tray with the first spine overlying the ends of the first and second trays and wherein the third tray is folded upon the first panel, with the second spine overlying ends of the first, second and third trays and the third panel becoming the cover.

10. The apparatus of claim 1 further comprising a lower layer connected to the base, the lower layer being co-extensive with the base and having side edges with cut-outs for receiving the rails, the lower layer having a thickness corresponding to the thickness of the rails, and the outer layer and the rails forming a smooth lower surface of the package.

11. The apparatus of claim 1 wherein the tray is formed in a mold and the rails are formed by shut-offs extending from the mold.

12. The method of assembling a package comprising cupping a board in an axial direction, juxtaposing side edges of one panel of the board and a tray, releasing the board and extending side edges of the board outward along the tray, receiving downward extensions of the tray within recesses in side edges of the board and juxtaposing inner edges of the recesses with inner surfaces of the downward extensions.

13. The method of claim 12 further comprising positioning areas of the board inward of the recesses over rails which extend inward from the downward extensions.

14. The method of claim 13 further comprising folding the board along first and second spaced creases and forming a spine between the creases along a back of the tray, folding a second panel as a cover along the second crease.

15. The method of claim 12, further comprising placing a second tray on the cupped board, aligning second recesses on side edges of the second panel with second downward extensions on the second tray before releasing the cupping of the board, moving the second recesses into engagement with the second downward extensions and moving areas of the board inward from the second recesses along upward facing surfaces of second rails extending inward from the second downward projections, and wherein the folding of the board along the creases comprises folding the board along the first and second creases spaced apart a distance equal to thicknesses of the first and second trays for forming a spine, folding the spine against ends of the first tray and the second tray and folding the second panel and the second tray over the first panel and the first tray for closing the package.

16. The method of claim 13, further comprising placing a third tray on the cupped board, aligning third recesses in side edges of a third panel of the board with third downward extensions on the third tray before releasing the cupping on the board, moving the third recesses into engagement with the third downward extensions and moving board areas inward from the third recesses along upward facing surfaces of third rails extending inward from the third downward projections and wherein the folding of the board along creases further comprises folding the board along third and fourth creases spaced apart a distance equal to thicknesses of the first, second and third trays for forming a second spine, folding the second spine against ends of the first, second and third trays and folding the third panel and the third tray over the first panel for closing the package.

17. A plastic tray and board package comprising a plastic tray having an upper surface, a front and a back and opposite side walls joined to the upper surface, downward extensions on the opposite side walls and rails extending inward form the downward extensions, a board having a first and second panels and a spine between the panels and first and second creases between the spine and the first and second panels respectively, the first panel having a back edge at the first crease, having a front edge opposite the back edge and having opposite side edges extending between the front and back edges, recesses formed in the opposite side edges for receiving the downward extensions, the recesses having inner edges and the downward extensions having inner surfaces, the inner edges of the recesses fitting against the inner surfaces of the downward extensions for engaging the board and plastic tray.

18. The apparatus of claim 17, wherein the recesses have opposite end edges and wherein the downward extensions have opposite end edges, the end edges of the recesses fitting against the end edges of the downward extensions, the edges of the recesses cooperating with the surfaces of the downward extensions for preventing relative sliding of the tray and the board.

19. The apparatus of claim 17, further comprising rails extending inward from the downward extensions and surface areas of the board near the recesses lying over the rails.

* * * * *